C. E. FOSBURGH.

Canopy-Top for Carriages.

No. 8,074. Reissued Feb. 5, 1878.

Witnesses:

John C. Tunbridge

P. V. Briesen

Inventor:

Calvin E. Fosburgh by his attorney

A. v. Briesen

N. PETERS, PHOTO-LITHOGRAPHER, WASHINGTON, D. C.

UNITED STATES PATENT OFFICE.

CALVIN E. FOSBURGH, OF LOUISVILLE, KENTUCKY.

IMPROVEMENT IN CANOPY-TOPS FOR CARRIAGES.

Specification forming part of Letters Patent No. 191,233, dated May 29, 1877; Reissue No. 8,074, dated February 5, 1878; application filed January 18, 1878.

*To all whom it may concern:*

Be it known that I, CALVIN E. FOSBURGH, of the city of Louisville, in the county of Jefferson and State of Kentucky, have invented a certain new and useful Improvement in Canopy-Tops for Carriages and Buggies; and I do hereby declare that the following is a full, clear, and exact description thereof, which will enable others skilled in the art to make and use the same, reference being had to the accompanying drawings, forming part of this specification, in which—

Figure 1:
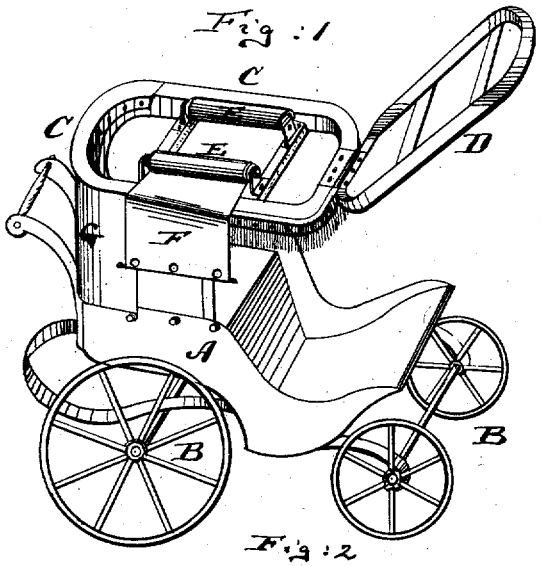
Figure 2:
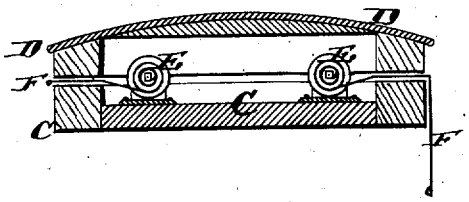

Figure 1 is a perspective view of the buggy with the lid of the canopy-top raised. Fig. 2 is a sectional view of the hollow canopy, showing the curtains and rollers therein.

Similar letters of reference indicate corresponding parts in all the figures.

This invention relates to certain improvements in canopy buggy and carriage tops; and consists in forming the canopy-top so that it will constitute a hollow box or case, provided with a hinged lid that may be closed down over the canopy. The inside of this hollow canopy is adapted to receive the carriage-curtains, which can be folded or placed into it.

The curtains may be secured to rollers, which are hung in the hollow canopy; or, if more convenient, all rollers may be dispensed with, and the curtains tacked to the frame of the hollow canopy.

The letter A represents the buggy, and B B the wheels, all of which are made in suitable form. C is the canopy-top, of sufficient depth to constitute a box or case, with permanent bottom. D is a lid or cover, hinged to the hollow canopy-top C, so that it can be closed down over the same in such manner as to make a neat finish around the edges, and so that it may cover the curtains placed within the hollow top. The lid, when closed down, may be secured by a hook or fastener.

E E are rollers, hung in the hollow canopy-top, and F F are the side curtains, the upper ends of which are secured to the rollers E E, while the bodies thereof pass out between the cover and top C, to be drawn down and secured to the sides of the body. To raise the curtains, it is only necessary to detach them below and wind them upon the rollers, thereby drawing them up into the box. The rollers are represented as spring-rollers.

G is the back curtain, secured with its upper part to the canopy-top C. When required to be raised it is turned up and folded into the box C.

As already stated, all rollers may be dispensed with, or the back curtain may also be secured to a roller, which is hung in the hollow canopy.

The hollow canopy-top, with its cover D, will constitute a very convenient receptacle for the curtains when the same are not to be used.

Having thus fully described the nature and object of this my invention, what I claim as new, and desire to secure by Letters Patent, is—

1. In a buggy or carriage, the hollow canopy-top C, provided with the lid D, and combined with the curtains, for which it constitutes a receptacle, substantially as specified.

2. The hollow canopy-top C, combined with the cover D, rollers E, and curtains, substantially as herein shown and described.

The foregoing description of my invention signed this 7th day of January, 1878.

CALVIN E. FOSBURGH.

Witnesses:

T. B. MOSHER,

JOHN C. TUNBRIDGE.